April 2, 1957  R. H. MERRITT  2,787,341
TORQUE RESPONSIVE FRICTIONAL MECHANISM
Filed Oct. 30, 1952  4 Sheets-Sheet 1

INVENTOR.
Robert H. Merritt.
BY
Donald L. Royer

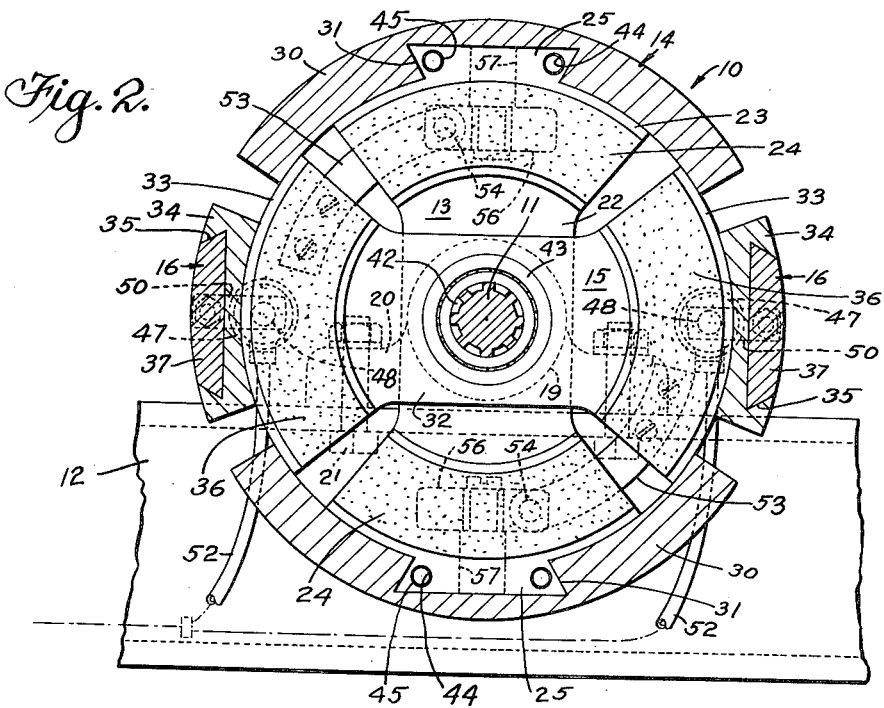

April 2, 1957  R. H. MERRITT  2,787,341
TORQUE RESPONSIVE FRICTIONAL MECHANISM
Filed Oct. 30, 1952  4 Sheets-Sheet 3

INVENTOR.
Robert H. Merritt.
BY
Donald L. Royer

April 2, 1957     R. H. MERRITT     2,787,341
TORQUE RESPONSIVE FRICTIONAL MECHANISM
Filed Oct. 30, 1952     4 Sheets-Sheet 4

INVENTOR.
Robert H. Merritt.
BY
Donald L. Royer

United States Patent Office 2,787,341
Patented Apr. 2, 1957

2,787,341

TORQUE RESPONSIVE FRICTIONAL MECHANISM

Robert H. Merritt, Los Angeles, Calif.

Application October 30, 1952, Serial No. 317,626

1 Claim. (Cl. 188—141)

This invention relates to a partially self energized frictional engaging mechanism and relates more particularly to such a mechanism as may be applied to brakes, clutches or other like devices wherein it is desired to frictionally engage one member with another.

In brakes, clutches and the like it has been found that in order to obtain sufficient surface for the engagement of suitable frictional material with other surfaces, that large drums, discs or like surfaces were necessary in order to present a large enough area. Furthermore, when large surfaces are utilized it is necessary to provide extremely large forces in order to properly engage relatively rotating surfaces. Such large forces have generally been obtained through the use of large complex and heavy actuating devices, these structures being necessarily heavy, expensive and adapted to occupy considerable valuable space. When such mechanisms are applied to aircraft for example, any savings that may be made in size and weight of the devices are extremely valuable.

It is therefore an object of the invention to provide a novel partially self energized frictional engaging mechanism of the class described that is relatively small in size, relatively light in weight, efficient in operation, reliable in use and relatively inexpensive in manufacture.

It is another object of the invention to provide a novel frictional engaging mechanism wherein the power for actuation of one portion thereof is derived from another portion thereof.

It is a further object of the invention to provide a novel actuating means for a partially self energized frictional engaging mechanism.

It is a still further object of the invention to provide a novel compact arrangement for a disc type frictional engaging mechanism.

It is another object of the invention to provide a frictional engaging mechanism of the class described that is adaptable for use either with brakes, clutches or other like devices.

Other and further important objects of the invention will become apparent from the disclosures in the following detailed description, appended claim, and accompanying drawings, wherein:

Fig. 2 is a transverse sectional view showing the frictional engaging surfaces of the mechanism and taken substantially as indicated by line 2—2, Fig. 1;

Fig. 3 is a transverse sectional view similar to Fig. 2 and taken substantially as indicated by line 3—3 Fig. 1;

Figure 1:
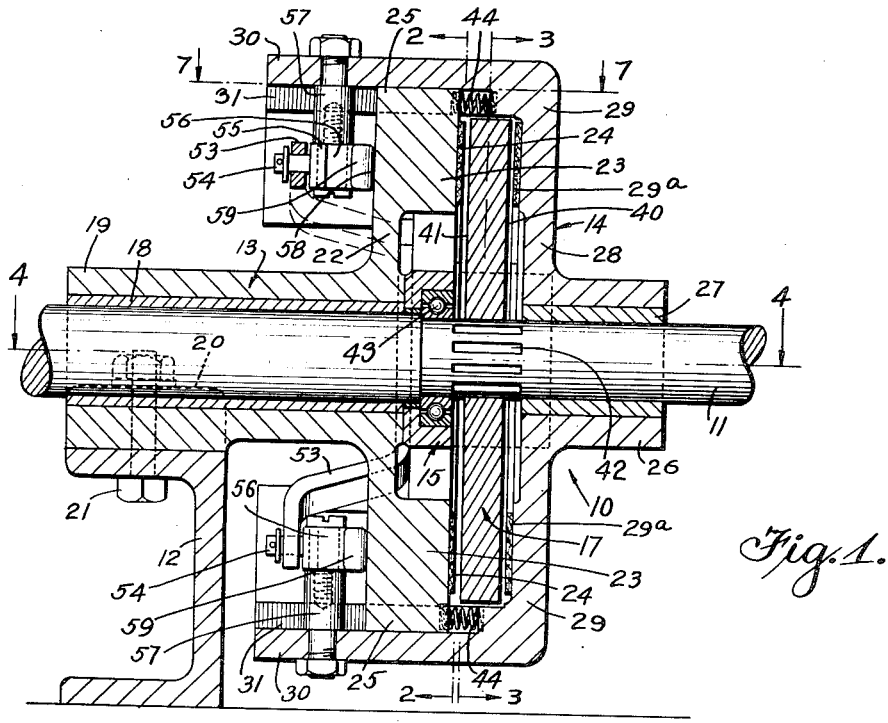
Fig. 1 is a longitudinal sectional view of the frictional engaging mechanism of the present invention.

Referring to the drawings by reference characters, the present invention as embodied in a frictional engaging mechanism is shown as indicated generally at 10. In general, the mechanism includes a shaft 11 mounted for rotation in a frame structure 12, a secondary supporting member 13, a secondary shoe type gripping member 14 adapted for association with the supporting member 13, a primary supporting means 15, a primary gripping shoe 16 and a suitable disc 17, the disc 17 being mounted on the shaft 11.

The shaft 11 is adapted to be rotatably supported in a suitable bearing 18 carried by a hub 19 which is formed on one side of the secondary supporting member 13. The hub 19 has laterally extending tabs 20 which are adapted to be secured to the frame structure 12 by means of suitable bolts indicated at 21.

Figure 8:
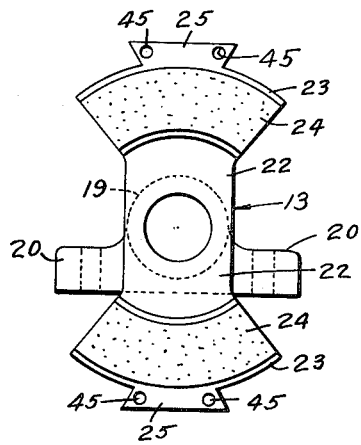
Fig. 8 is a detail elevation view of the frame structure and secondary supporting means.

As shown primarily in Figs. 1 and 8, the secondary supporting member includes radially extending portions 22 which support integral segmental heads 23, the heads 23 being adapted to provide a surface for the retention of suitable lining 24. In all cases the lining utilized at various points in the present construction is of the low coefficient of friction type however different types of lining may be employed depending upon the particular installation of the device. Dovetails are formed integral with and on the periphery of the heads 23 the purpose of which will be later described.

Figure 10:
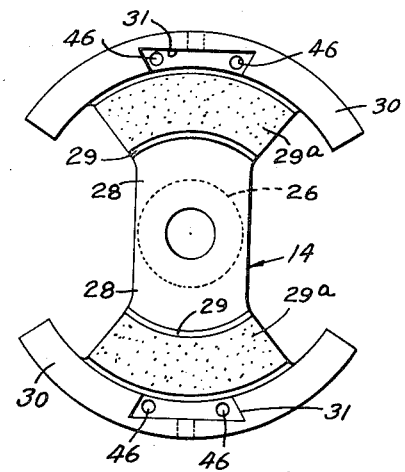
Fig. 10 is a detail elevation view of the secondary gripping member adapted for association with the secondary supporting member showing in Fig. 8.

As shown primarily in Figs. 1 and 10, the gripping means 14 includes a centrally disposed hub 26 which is adapted to support a bearing 27, the bearing 27 being adapted to surround a portion of the shaft 11. Radially extending portions 28 are adapted to extend from the hub 26 and are provided at their outer ends with segmental portions 29, the portions 29 being adapted to carry suitable lining 29a. Peripheral segmental portions 30 are adapted to extend axially from the periphery of the segmental portions 29. A longitudinal groove 31 is provided in each of the segmental sections 30 for the reception of the dovetail 25 of the supporting member 13 to thus permit axial movement of the member 14 relative to the member 13.

Figure 4:
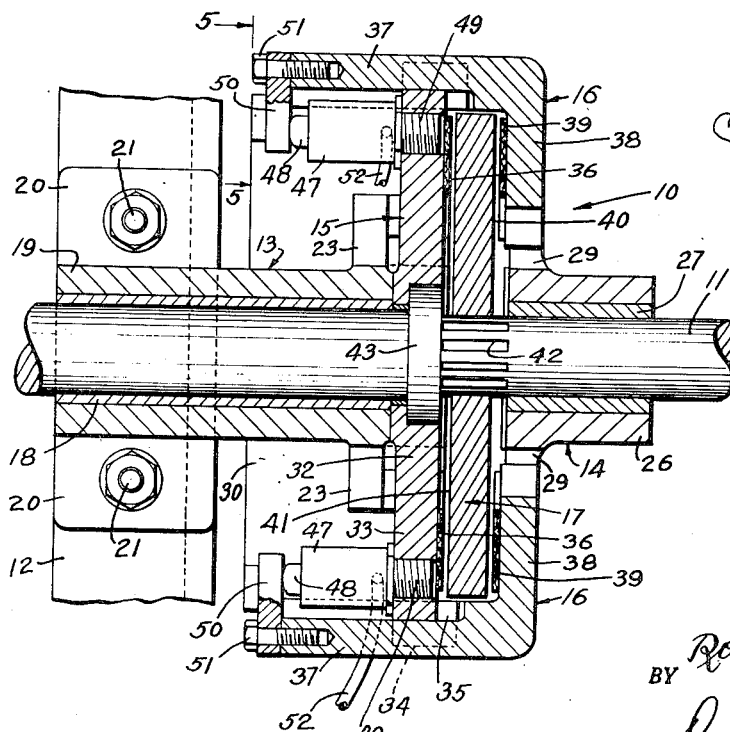
Fig. 4 is a longitudinal sectional view rotated 90° from and taken substantially as indicated by line 4—4, Fig. 1.
Figure 5:
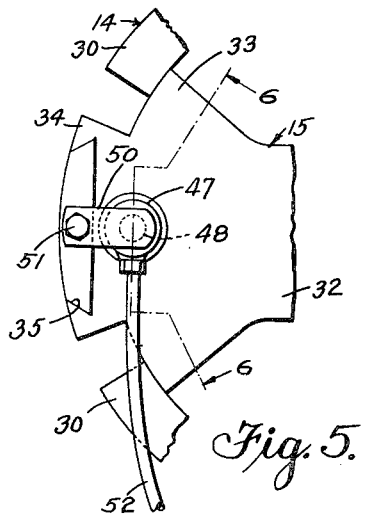
Fig. 5 is a fragmentary elevation view of hydraulic cylinder actuating means for the present mechanism and taken substantially as indicated by line 5—5, Fig. 4.
Figure 6:
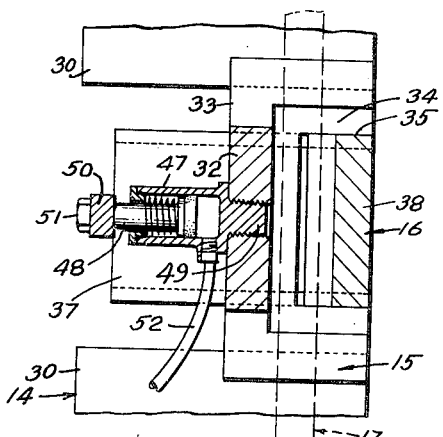
Fig. 6 is a fragmentary sectional view through the hydraulic cylinder actuating mechanism and taken substantially as indicated by line 6—6, Fig. 5.
Figure 9:
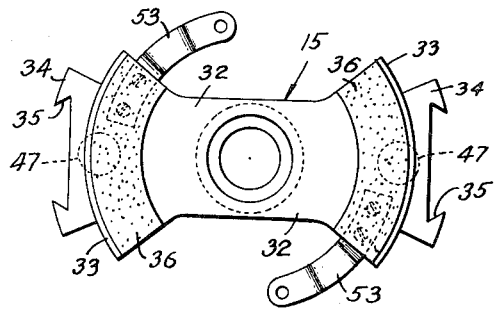
Fig. 9 is a detail elevation view of the primary supporting means.

The primary supporting member 15 is shown primarily in Figs. 4 and 9 and includes radially extending portions 32 which terminate in enlarged segmental portions 33, the portions 33 being adapted, on their peripheries, to support guide members 34 which have longitudinal grooves 35 formed therein. Suitable lining 36 is secured to the segmental portions 33 of the member 15.

Figure 11:
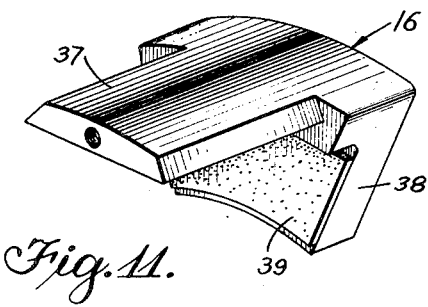
Fig. 11 is a detail perspective view of the primary gripping member adapted for association with the primary supporting member of Fig. 9.

The primary gripping shoe member 16 is shown in detail primarily in Figs. 4 and 11 and includes a longitudinally extending dovetail portion 37 which is adapted to be received in the groove 35 in the guide 34 of the primary supporting member 15. A shoe portion 38 is formed integral with the dovetail 37 and extends radially inwardly, there being suitable lining 39 secured to one face thereof.

As shown primarily in Figs. 2 and 3 the primary and secondary supporting members and their associated gripping shoes are arranged in a segmental fashion about the surfaces 40 and 41 of the disc 17, the disc 17 being mounted on the shaft 11 by means of suitable splines 42 to thus permit axial movement of the disc but prohibit radial movement thereof relative to the shaft 11. It is to be noted that the secondary supporting member 13 and its associated gripping shoe 14 are secured against rotation to the frame structure 12 while the primary supporting member 15 is rotatably mounted on a suitable bearing 43 about the shaft 11 and disposed intermediate the radially extending portions 22 of the secondary supporting member 13 and the disc 17. Therefore the segmental portions 33 of the primary supporting member 15 are adapted to float intermediate the radial ends of the segmental portions 23 of the secondary supporting member 13.

The lining 24 on the segmental portion 23 and the lining 29a on the segmental portion of the gripping member 14 are normally held spaced from the surfaces 40 and 41 of the disc 17 by means of suitable compression springs 44 which are positioned in openings 45 in the member 13 and in openings 46 in the member 14.

In order to provide actuating means for the primary gripping shoe 16, a pair of hydraulic cylinders 47 having plungers 48 are secured as by a threaded connection 49 to one side of the segmental portion 33 of the primary supporting member 15. The plungers 48 are adapted to engage inwardly extending arms 50, the arms 50 being secured to the dovetail portion 37 of the member 16 by means of suitable bolts 51. It may thus be seen that upon introduction of hydraulic fluid pressure to the interior of the cylinder 47 through a suitable conduit 52, that the plungers will be moved axially to engage the arms 50 and cause movement of the dovetail 37 in the groove 35 to bring the linings 36 and 39 into contact with the surfaces 40 and 41 of the disc 17.

Figure 7:
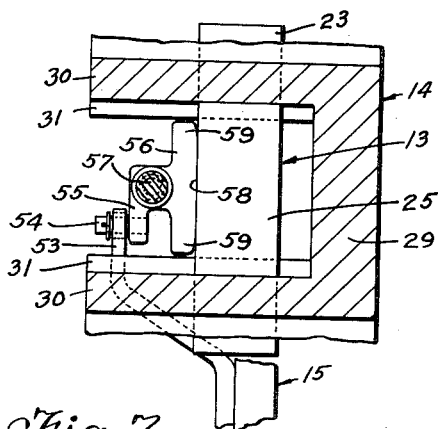
Fig. 7 is a fragmentary sectional view of the secondary shoe actuating means and taken substantially as indicated by line 7—7, Fig. 1.

In order to transmit a gripping force from the primary gripping means to the secondary gripping means upon engagement of the primary gripping means with the surfaces 40 and 41 of the disc 17, a pair of arms 53 are adapted to extend circumferentially and outwardly from one side of the primary supporting member 15. As shown primarily in Figs. 1 and 7, the outer ends of the arms 53 are adapted to make pivotal connections with a pin 54, the pin 54 being secured to a lever 55 which is formed outwardly from a T-shaped actuating member 56. The actuating member 56 is pivotally supported on a post 57, the post 57 being secured to the bottom portion of the groove 31 in the secondary supporting member 14 at a point spaced from the rearwardly directed surface 58 of the secondary supporting member 13. As shown in Fig. 7, the T-shaped member 56 is adapted to normally engage the surface 58, and wings 59—59 thereof acting to move the gripping member 14 axially relative to the supporting member 13 upon rotation of the T-shaped member 56 about the supporting post 57.

To continue the operation of the device it may now be seen that upon slight circumferential rotation of the primary supporting member 15 and its associated gripping shoe 16 upon contact of these members with the surfaces 40 and 41 of the disc, that this slight circumferential movement will be transmitted through the arms 53 and the T-shaped member 56 to cause actuation of the secondary gripping member 14 and movement of the linings 24 and 29a into engagement with the surfaces 40 and 41 of the disc 17. As the force transmitted from the cylinders 47 is increased there will be a greater tendency to rotate the supporting member 15 and thus transmit a greater force to the T-shaped member 56 and thence to the gripping shoe 14 to thus apply a greater frictional engagement intermediate the fixed frame structure 12 and the shaft 11 through the disc 17. As this force is increased, any tendency for the linings to grab or severely engage the surfaces 40 and 41 of the disc 17 may be obviated by means of suitable low coefficient of friction lining. As referred to hereinbefore, the frictional coefficient of the lining will depend largely upon the type of installation utilized in connection with the present mechanism.

Figure 12:
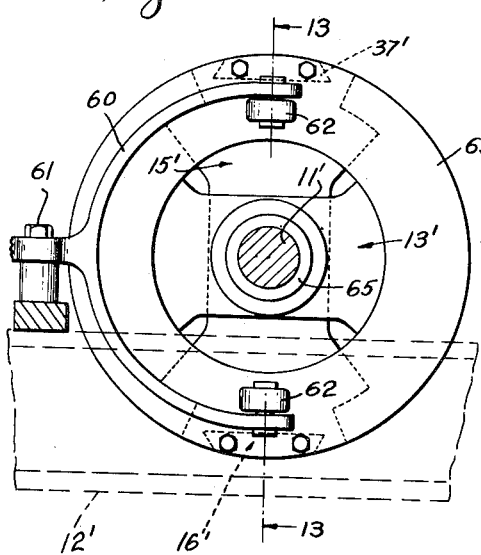
Fig. 12 is a transverse elevation view of a modified arrangement showing a portion of the actuating means therefore.
Figure 13:
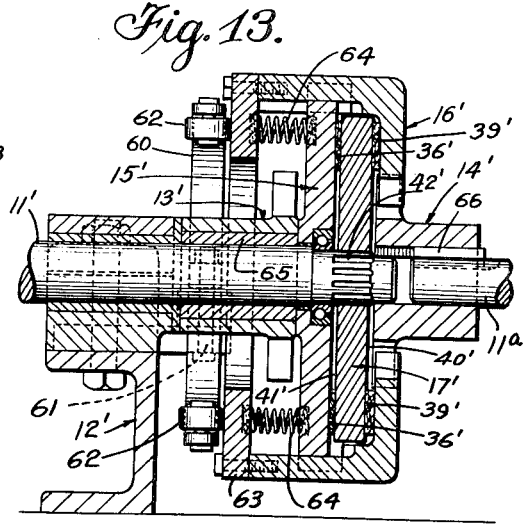
Fig. 13 is a transverse sectional view of the modification of Fig. 12 and taken substantially as indicated by line 13—13, Fig. 12.

In Figs. 12 and 13 a modification of the invention is shown wherein like parts are represented by single primed reference numerals. In this modification the actuating means for the primary gripping shoes 16' is a mechanical arrangement consisting of a yoke 60 supported for rotation as at 61 and adapted to carry a pair of rollers 62, the rollers 62 being engageable with a ring 63 which is mounted on the dovetail portions 37' of the members 16. It is to be noted in this modification that the particular arrangement is adaptable for use in a mechanism such as a clutch, and that the gripping means both primary and secondary are normally engaged with the disc 17. This engagement is maintained by means of a pair of compression springs 64 which are disposed intermediate the ring 63 and the primary supporting member 15'. Movement of the yoke 60 will compress the springs 64 to release the gripping means from the surfaces 40' and 41' of the disc 17'. As a further modification, in this arrangement the secondary supporting member 13' is mounted on a suitable bearing 65 to enable rotation thereof about the shaft 11', there being a stub shaft 11a secured to the hub 26' of the secondary gripping shoe 14' by means of a suitable key 66.

Having thus described the invention and the present embodiments thereof, it is desired to emphasize the fact that many modifications and arrangements may be resorted to in a manner limited only by a just interpretation of the following claim.

I claim:

A partially self energized frictional engaging mechanism comprising, in combination: a fixed frame structure; a shaft rotatably mounted in said frame structure; a disc having centrally disposed splines, said disc being secured against rotation on mating splines on said shaft, and presenting radial surfaces; a segmented secondary supporting member secured to said frame; secondary gripping means in the form of shoes, said gripping means being associated with said secondary supporting member and adapted to engage said disc surfaces upon actuation of said gripping means; a segmented primary supporting member disposed intermediate a portion of said secondary supporting member and said disc, said primary supporting member being mounted for rotation on said shaft; primary gripping means in the form of shoes associated with said primary supporting means; linkage means operable by slight circumferential movement of said primary gripping means to cause actuation of said secondary gripping means into contact with said disc surfaces upon engagement of said primary gripping means with said disc surfaces; and means to actuate said primary gripping means into contact with said disc surfaces.

References Cited in the file of this patent

UNITED STATES PATENTS

| | | |
|---|---|---|
| 2,070,470 | Clench | Feb. 9, 1937 |
| 2,108,467 | Backstrom | Feb. 15, 1938 |
| 2,256,725 | Pierce et al. | Sept. 23, 1941 |
| 2,355,827 | Stelzer | Aug. 15, 1944 |
| 2,419,113 | Bricker | Apr. 15, 1947 |
| 2,477,758 | Majneri | Aug. 2, 1949 |